(12) United States Patent
Lee

(10) Patent No.: US 7,439,762 B2
(45) Date of Patent: Oct. 21, 2008

(54) ON-DIE TERMINATION CIRCUIT

(75) Inventor: Geun-Il Lee, Kyoungki-do (KR)

(73) Assignee: Hynix Semiconductor Inc. (KR)

( * ) Notice: Subject to any disclaimer, the term of this patent is extended or adjusted under 35 U.S.C. 154(b) by 0 days.

(21) Appl. No.: 11/645,966

(22) Filed: Dec. 27, 2006

(65) Prior Publication Data

US 2008/0074138 A1 Mar. 27, 2008

(30) Foreign Application Priority Data

Sep. 27, 2006 (KR) ...................... 10-2006-0094135

(51) Int. Cl.
*H03K 19/003* (2006.01)
(52) U.S. Cl. .......................................... 326/30; 326/31
(58) Field of Classification Search .................... 326/30
See application file for complete search history.

(56) References Cited

U.S. PATENT DOCUMENTS

| 6,157,206 | A  | * | 12/2000 | Taylor et al. | ................... | 326/30 |
| 7,176,711 | B2 | * | 2/2007 | Park et al. | ...................... | 326/30 |
| 7,288,959 | B1 | * | 10/2007 | Lee | .............................. | 326/30 |

* cited by examiner

*Primary Examiner*—James H Cho
(74) *Attorney, Agent, or Firm*—Blakely, Sokoloff, Taylor & Zafman

(57) ABSTRACT

An on-die termination circuit includes: a feedback unit for outputting a feedback signal in response to a plurality of code signals corresponding to an input-resistor; a code signal generation unit for generating the plurality of code signals in order for the feedback signal to have a level corresponding to a reference voltage; and a control unit for continuously enabling the feedback unit in response to an initialization signal in order to repeatedly operate the code signal generation unit while the feedback unit is continuously enabled.

13 Claims, 7 Drawing Sheets

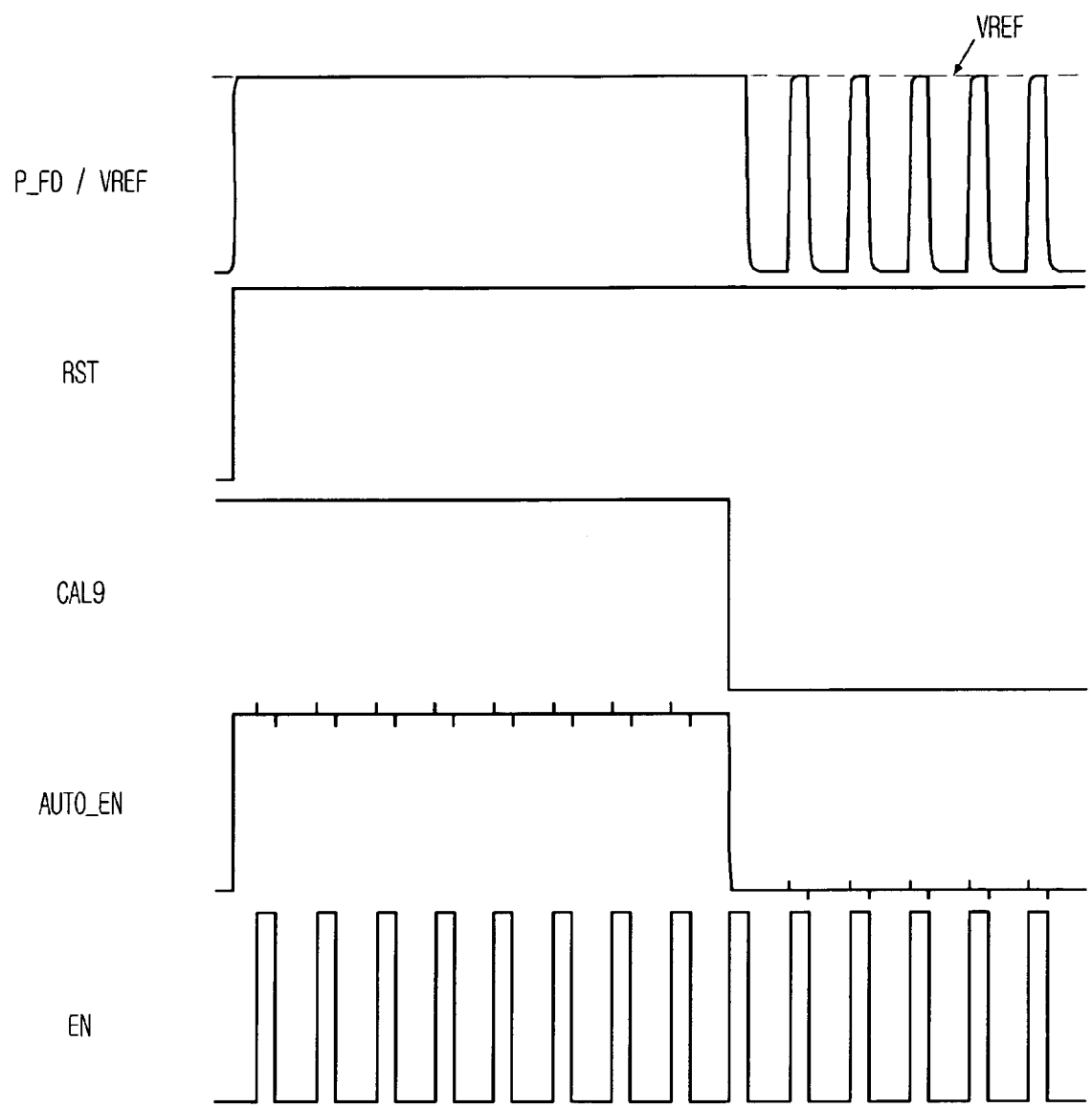

ON-DIE TERMINATION CIRCUIT

CROSS-REFERENCE TO RELATED APPLICATIONS

The present invention claims priority of Korean patent application number 10-2006-0094135, filed on Sep. 27, 2006, which is incorporated by reference in its entirety.

BACKGROUND OF THE INVENTION

The present invention relates to semiconductor design technology, and more particularly, to an on-die termination circuit for generating a correct termination resistance that is rarely influenced by a variation of process, voltage and temperature (PVT)

Generally, various semiconductor devices manufactured as an integrated chip such as a central processing unit (CPU), a memory and a gate array are used in various electrical products such as a personal computer, a server and a workstation. Most of the semiconductor devices include a receiving circuit for receiving signals from the outside world through an input pad and an output circuit for outputting an internal signal to the outside world through an output pad.

As an operational speed of an electrical product is increased, a swing width of a signal interfaced among the semiconductor devices is decreased in order to minimize a delay time for transferring a signal. However, as the signal swing width is decreased, influence from external noise is increased and signal reflection due to impedance mismatching at an interface terminal is increased.

The impedance mismatching is caused by external noise or the PVT variation. When the impedance mismatching occurs, it is difficult to transfer data at high speed, and data output from an output terminal of the semiconductor device may be distorted. Therefore, when another semiconductor device receives the distorted data through an input terminal, a set-up/hold failure may occur or a level of the received data may be wrongly determined.

For solving the above-mentioned problem, the receiving semiconductor device which is operated at high speed includes an impedance matching circuit named an on-chip termination or an on-die termination near a pad in the integrated chip.

Generally, according to an on-die termination scheme, a source termination is performed by an output circuit at a transmitting device, and a parallel termination is performed by a termination circuit connected in parallel to a receiving circuit coupled to the input pad at a receiving device.

FIG. 1 is a block diagram showing a conventional on-die termination circuit.

As shown, the conventional on-die termination circuit includes a feedback unit 20, a comparison unit 30, a counting unit 40 and a control unit 10.

The feedback unit 20 receives an enable signal EN in order to output a level, of a code signal group P_CD<0:4> corresponding to an input-resistor ZQ, as a feedback signal P_FD. The comparison unit 30 detects a level difference between a reference voltage VREF and the feedback signal P_FD in response to the enable signal EN and a comparison enable signal LTCH_EN in order to output the detection result as a control signal CTRL.

The counting unit 40 up-counts or down-counts the code signal group P_CD<0:4> in response to the control signal CTRL. The control unit 10 repeatedly activates the enable signal EN and the comparison enable signal LTCH_EN in response to an initialization signal RST.

Herein, the control unit 10 includes a pulse signal generation unit 12, a completion timing indication unit 14 and an enable signal generation unit 16.

The pulse signal generation unit 12 generates a pulse signal CALP at regular intervals in response to the initialization signal RST. The completion timing indication unit 14 counts how many times the pulse signal CALP is activated in order to generate a completion signal CAL_STP.

The enable signal generation unit 16 repeatedly activates the enable signal EN and the comparison enable signal LTCH_EN in response to the pulse signal CALP and does not generate the enable signal EN and the comparison enable signal LTCH_EN in response to the completion signal CAL_STP.

Herein, the input-resistor ZQ is externally input through an input pin having a resistance of 240Ω between the input pad and a ground voltage. Further, the code signal group P_CD<0:4> has a level value of a binary code format. Furthermore, although not shown in FIG. 1, the on-die termination circuit includes a termination resistor supply unit for supplying a termination resistor to a data pad, wherein the termination resistor has a resistance which corresponds to the code signal group P_CD<0:4>.

FIG. 2 is a schematic circuit diagram illustrating the feedback unit 20 shown in FIG. 1.

As shown, the feedback unit 20 includes a signal input unit 22 for outputting the code signal group P_CD<0:4> as a selection signal group CD<0:4> in response to the enable signal EN; and a feedback signal supply unit 24 for outputting a voltage level of the selection signal group CD<0:4> corresponding to the input-resistor ZQ as the feedback signal P_FD.

In detail, the signal input unit 22 includes a plurality of NAND gates, each for receiving the enable signal EN and a corresponding one of the code signal group P_CD<0:4> in order to generate a corresponding one of the selection signal group CD<0:4>.

The feedback signal supply unit 24 includes a plurality of p-type metal oxide semiconductor (PMOS) transistors each of which has a gate that receives a corresponding one of the selection signal group CD<0:4> and each source is connected to a voltage VDDQ; a plurality of resistors each of which is connected between an output node and a drain of one of the plurality of PMOS transistors; and the input-resistor ZQ coupled to the output node in order to output a voltage loaded on the output node as the feedback signal P_FD.

An operation of the feedback unit 20 is described below.

When the enable signal EN is activated as a logic high level, the signal input unit 22 inverts the code signal group P_CD<0:4> to output the inverted signal as the selection signal group CD<0:4>.

Thereafter, one of the plurality of PMOS transistors is turned on in response to an activation of a corresponding one of the selection signal group CD<0:4> and thus a resistor coupled to one terminal of the active PMOS transistor is connected in parallel to the output node so that the feedback signal supply unit 24 outputs the feedback signal P_FD. That is, according to a resistance ratio between a pull-up resistor and the input-resistor ZQ, a voltage level of the feedback signal P_FD is determined. Herein, the pull-up resistor is formed because the resistor coupled to a drain of the active PMOS transistor is connected in parallel to the output node.

FIG. 3 is a wave diagram showing an operation of the conventional on-die termination circuit shown in FIGS. 1 and 2.

Referring to FIGS. 1 to 3, the operation of the conventional on-die termination circuit is described below.

When a semiconductor memory device is initially operated, as a voltage level of an external power supply voltage is stabilized, a power-up signal PWRUP is activated as a pulse form. At this time, the initialization signal RST is also activated.

Thereafter, the pulse signal generation unit 12 generates the pulse signal CALP at regular intervals in response to the initialization signal RST. The enable signal generation unit 16 activates the enable signal EN and the comparison enable signal LTCH_EN in response to each activation of the pulse signal CALP. Herein, while the enable signal EN is activated once, the comparison enable signal LTCH_EN is activated twice.

Thereafter, the feedback unit 20 outputs a level of the code signal group P_CD<0:4> corresponding to the input-resistor ZQ as the feedback signal P_FD in response to the enable signal EN. Thereafter, the comparison unit 30 detects a level difference between the reference voltage VREF and the feedback signal P_FD in response to the enable signal EN and the comparison enable signal LTCH_EN to output the control signal CTRL.

Thereafter, the counting unit 40 performs a down-counting operation or an up-counting operation based on a current version of the code signal group P_CD<0:4> according to the control signal CTRL in order to generate a new version of the code signal group P_CD<0:4>.

Meanwhile, when the feedback unit 20 is enabled once, the comparison unit 30 and the counting unit 40 are enabled twice because the comparison enable signal LTCH_EN is activated twice when the enable signal EN is activated once as above-mentioned.

Thereafter, the above-mentioned operation is performed ten times. Then, the enable signal generation unit 16 no more generates the enable signal EN and the comparison enable signal LTCH_EN as instructed by the completion timing indication unit 14.

That is, the completion timing indication unit 14 activates the completion signal CAL_STP when the pulse signal CALP is activated more than ten times. Thereafter, the enable signal generation unit 16 does not generate the enable signal EN and the comparison enable signal LTCH_EN, in response to the completion signal CAL_STP.

As a result, the conventional on-die termination circuit repeatedly performs the above-mentioned operations to adjust the feedback signal P_FD so that a voltage level of the feedback signal P_FD corresponds to the reference voltage VREF and, thus, a resistance of a termination resistor supplied by the code signal group P_CD<0:4> equals that of the input-resistor ZQ.

Herein, the reference voltage VREF has a voltage level of (½)*VDDQ. Therefore, the code signal group P_CD<0:4> is adjusted for the feedback signal P_FD to have the voltage level (½)*VDDQ.

However, according to the conventional on-die termination circuit, a termination resistor which corresponds to the input-resistor ZQ cannot be generated when the PVT variation occurs. Thus, a semiconductor memory device is abnormally operated.

FIG. 4 is a wave diagram showing a malfunction of the conventional on-die termination circuit due to the PVT variation. Particularly, a level variation of the feedback signal P_FD is shown when the enable signal EN is activated once.

Referring to FIG. 4, since the feedback unit 20 is enabled by the activation of the enable signal EN, a level of the feedback signal P_FD is developed by the pull-up resistor which corresponds to the code signal group P_CD<0:4> and the input-resistor ZQ.

However, at the timing point 'a' when the comparison enable signal LTCH_EN is firstly activated, the feedback signal P_FD is not completely developed to a level which corresponds to the pull-up resistor and the input-resistor ZQ. Accordingly, when the comparison enable signal LTCH_EN is firstly activated, the comparison unit 30 and the counting unit 40 receive the wrong feedback signal P_FD to be operated.

In detail, since the feedback signal P_FD is not completely developed at the first activation of the comparison enable signal LTCH_EN, the comparison unit 30 determines that a level of the feedback signal P_FD is low in comparison with the reference voltage VREF and, thus, outputs a signal of a logic low level. The counting unit 40 up-counts the code signal group P_CD<0:4> in response to the output signal of the comparison unit 30.

Thereafter, at a second activation timing of the comparison enable signal LTCH_EN, the level development of the feedback signal P_FD according to the pull-up resistor and the input-resistor ZQ is finished. Further, since the code signal group P_CD<0:4> is up-counted at the first activation timing, a level of the feedback signal P_FD is higher than the reference voltage VREF.

Therefore, the comparison unit 30 outputs a signal of a logic high level and the counting unit 40 down-counts the code signal group P_CD<0:4>. Accordingly, while the enable signal EN is activated once, the comparison unit 30 and the counting unit 40 up-count the code signal group P_CD<0:4> once and down-count the code signal group P_CD<0:4> once.

Since the conventional on-die termination circuit performs the above-mentioned operation ten times, the up-counting and the down-counting are repeatedly performed at each operation. As a result, the code signal group P_CD<0:4> is not changed substantially.

Herein, the development time of the feedback signal P_FD is varied according to a capacitance of a pad through which the input-resistor is input and a resistance of the pull-up resistor in the feedback unit. For instance, when the capacitance is large and the resistance is large, the development time is increased. Further, the development time is increased due to the PVT variation.

Meanwhile, since the conventional on-die termination circuit is abnormally operated due to the PVT variation, a termination resistor which corresponds to the input-resistor cannot be generated. Since the termination resistor is used for a semiconductor memory device to normally receive a command, an address and a data, a semiconductor memory device may be abnormally operated due to the wrong termination resistor.

SUMMARY OF THE INVENTION

Embodiments of the present invention are directed to an on-die termination circuit for supplying a correct termination resistor in spite of the PVT variation.

In accordance with an aspect of the present invention, there is provided an on-die termination circuit, including: a feedback unit for outputting a feedback signal in response to a plurality of code signals corresponding to an input-resistor; a code signal generation unit for generating the plurality of code signals in order for the feedback signal to have a level corresponding to a reference voltage; and a control unit for continuously enabling the feedback unit in response to an initialization signal in order to repeatedly operate the code signal generation unit while the feedback unit is continuously enabled.

In accordance with another aspect of the present invention, there is provided an on-die termination circuit, including: a feedback unit for outputting a feedback signal in response to a plurality of code signals corresponding to an input-resistor and first and second enable signals; a code signal generation unit for generating the plurality of code signals in order for the feedback signal to have a level corresponding to a reference voltage in response to the first enable signal and a comparison enable signal; and a control unit for keeping an activation state of the second enable signal at a first period, repeatedly activating the second enable signal at a second period, and repeatedly activating the first enable signal and the comparison enable signal at the first and second periods.

In accordance with a further another aspect of the present invention, there is provided a method for operating an on-die termination circuit, including: outputting a feedback signal continuously in response to a plurality of code signals corresponding to an input-resistor; and adjusting the plurality of code signals repeatedly for the feedback signal to have a target level corresponding to a reference voltage during the step of outputting the feedback signal.

In accordance with a further another aspect of the present invention, there is provided a method for operating an on-die termination circuit, including: outputting a feedback signal in response to a plurality of code signals corresponding to an input-resistor; and adjusting the plurality of code signals for the feedback signal to have a target level corresponding to a reference voltage, wherein the step of adjusting the plural bits of code signal is repeatedly performed while the step of outputting the feedback signal is continuously performed at a first period, and an operation of performing the step of adjusting the plural bit of code signal twice after performing the step of outputting the feedback signal once is repeatedly performed at a second period after the first period.

In accordance with a further another aspect of the present invention, there is provided a method for calibrating an on-die termination circuit, including: performing an on-die termination (ODT) calibration operation continuously for a predetermined time in response to a plurality of code signals during an initial period; and performing the ODT calibration operation in response to the plurality of code signals only when an enable signal is activated after the predetermined time.

BRIEF DESCRIPTION OF THE DRAWINGS

FIG. 7 is a wave diagram showing an operation of an on-die termination circuit in accordance with a second embodiment of the present invention.

DESCRIPTION OF SPECIFIC EMBODIMENTS

It is an object of the present invention to provide an on-die termination circuit for supplying a correct termination resistor in spite of the PVT variation. Accordingly, by using the on-die termination circuit in accordance with the present invention, an abnormal operation of a semiconductor device due to an incorrect termination resistor can be prevented.

Hereinafter, an on-die termination circuit in accordance with the present invention will be described in detail referring to the accompanying drawings.

Figure 1:
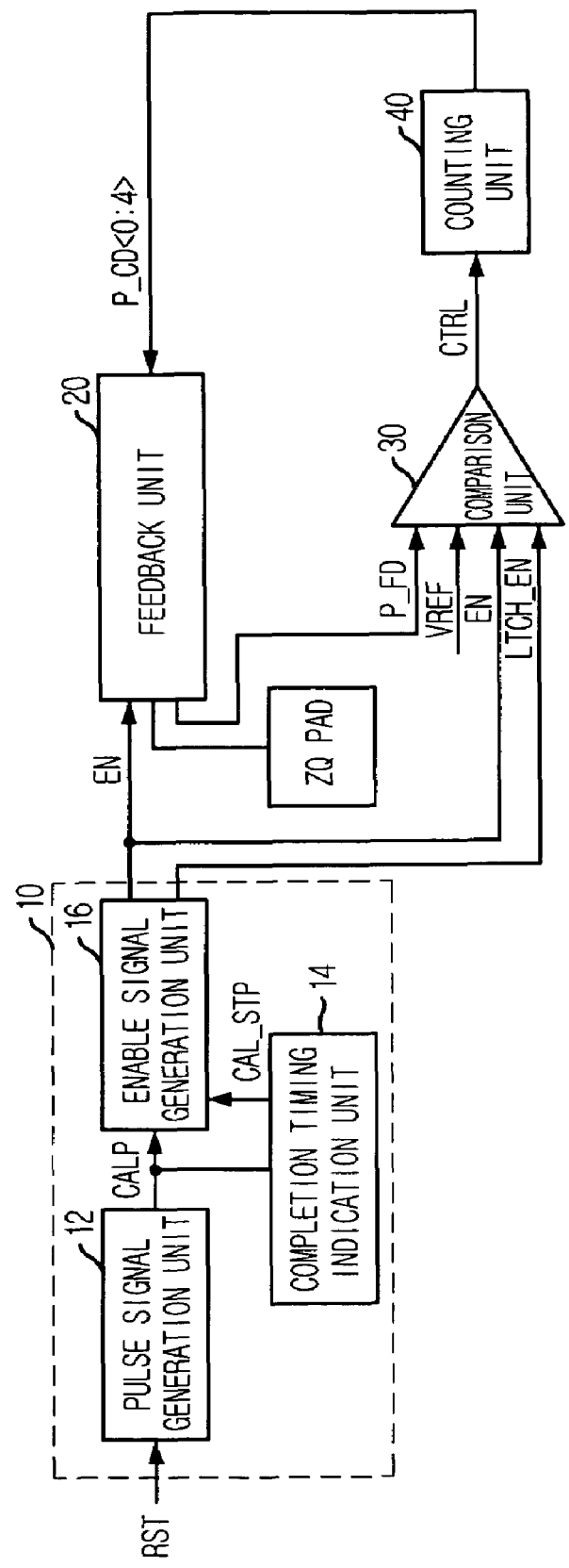
FIG. 1 is a block diagram showing a conventional on-die termination circuit.
Figure 2:
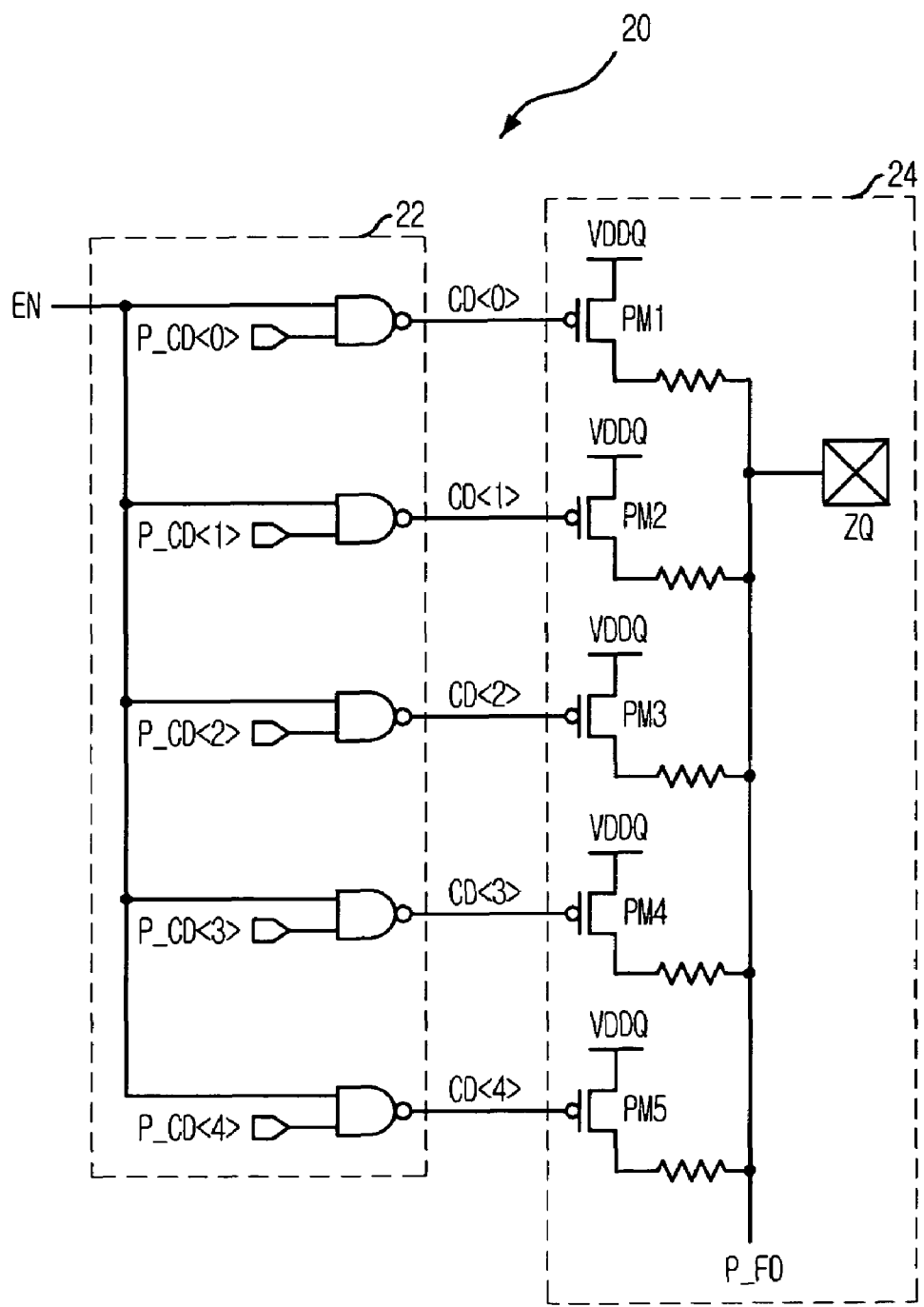
FIG. 2 is a schematic circuit diagram illustrating a feedback unit shown in FIG. 1.
Figure 3:
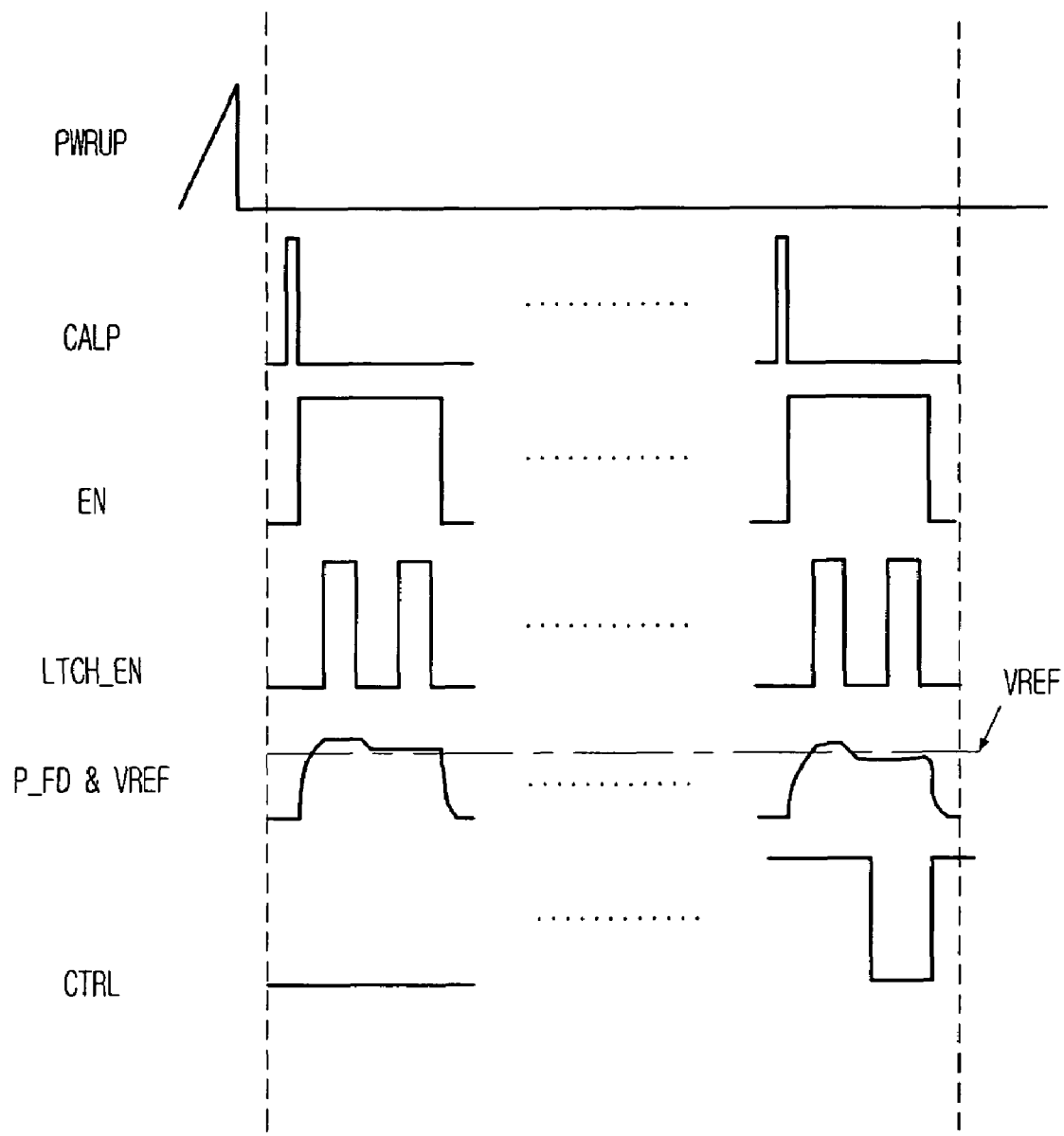
FIG. 3 is a wave diagram showing an operation of the conventional on-die termination circuit shown in FIGS. 1 and 2.
Figure 4:
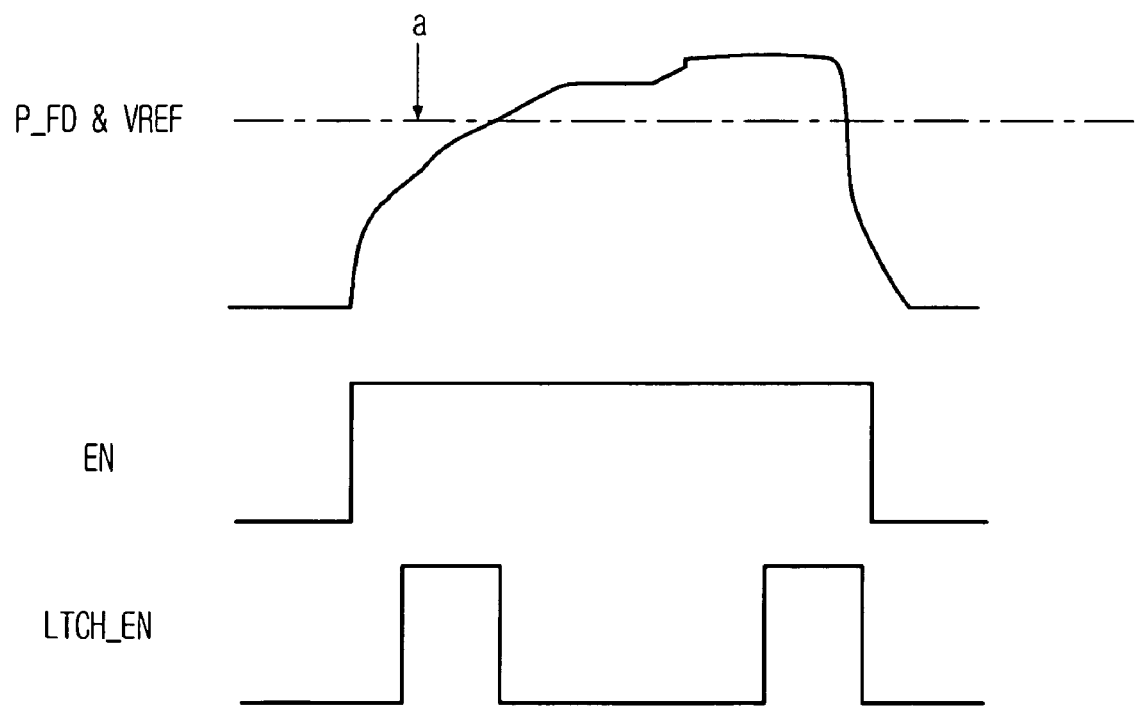
FIG. 4 is a wave diagram showing a malfunction of the conventional on-die termination circuit due to the PVT variation.
Figure 5:
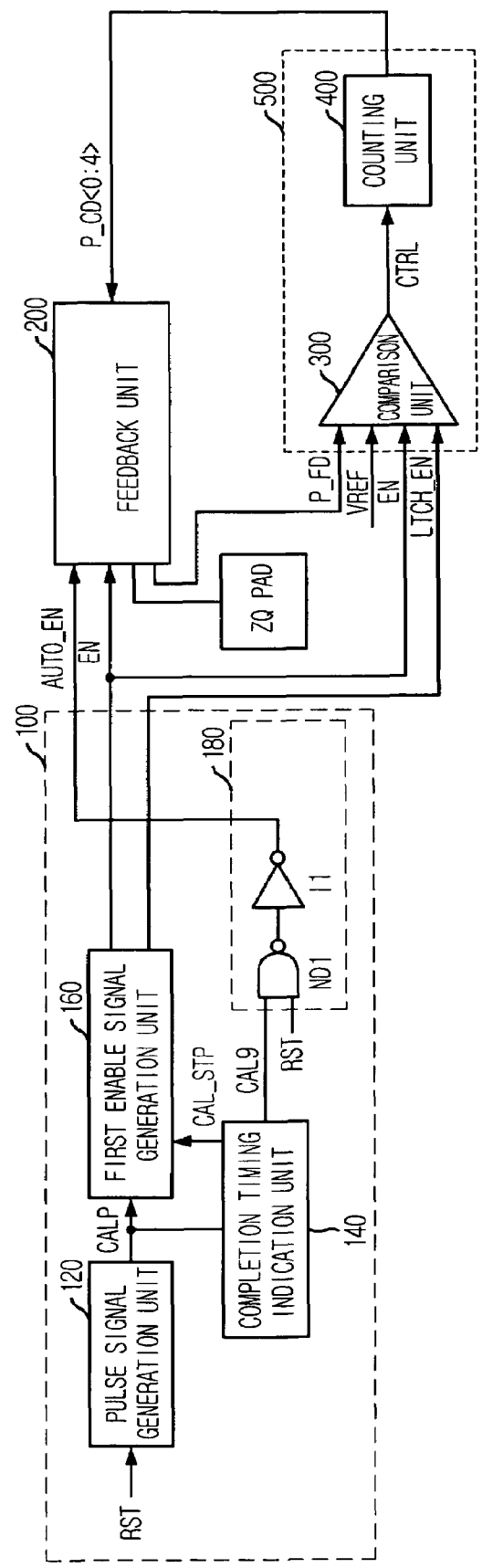
FIG. 5 is a block diagram showing an on-die termination circuit in accordance with a first embodiment of the present invention.

FIG. 5 is a block diagram showing an on-die termination circuit in accordance with a first embodiment of the present invention.

As shown, the on-die termination circuit includes a feedback unit 200, a code signal generation unit 500 and a control unit 100.

The feedback unit 200 outputs a level of a code signal group P_CD<0:4> corresponding to an input-resistor ZQ as a feedback signal P_FD in response to a first enable signal EN and a second enable signal AUTO_EN. The code signal generation unit 500 generates the code signal group P_CD<0:4> in response to the first enable signal EN and a comparison enable signal LTCH_EN so that the feedback signal P_FD has a level corresponding to a reference voltage VREF. The control unit 100 repeatedly operates the code signal generation unit 500 while the feedback unit 200 is continuously enabled by the control unit 100 in response to an initialization signal RST.

The control unit 100 includes a pulse signal generation unit 120, a completion timing indication unit 140, a first enable signal generation unit 160 and a second enable signal generation unit 180.

The pulse signal generation unit 120 generates a pulse signal CALP which has a particular period. The completion timing indication unit 140 activates an auto-period signal CAL9 in response to an activation of the pulse signal CALP; and activates a completion signal CAL_STP and inactivates the auto-period signal CAL9 when the pulse signal CALP is activated N times or more.

The first enable signal generation unit 160 activates the first enable signal EN and the comparison enable signal LTCH_EN at each activation time of the pulse signal CALP and inactivates the first enable signal EN and the comparison enable signal LTCH_EN in response to the completion signal CAL_STP. The second enable signal generation unit 180 generates the second enable signal AUTO_EN in response to the auto-period signal CAL9 and the initialization signal RST. Herein, N is a natural number, e.g., 10.

In detail, the second enable signal generation unit 180 includes a NAND gate ND1 for receiving the auto-period signal CAL9 and the initialization signal RST, and an inverter I1 for inverting an output of the NAND gate ND1 to generate the second enable signal AUTO_EN.

The code signal generation unit 500 includes a comparison unit 300 for detecting a level difference between the feedback signal P_FD and the reference voltage VREF in order to output the detection result as a control signal CTRL in response to the first enable signal EN and the comparison enable signal LTCH_EN; and a counting unit 400 for up-counting or down-counting the code signal group P_CD<0:4> in response to the control signal CTRL.

In accordance with the first embodiment of the present invention, when the initialization signal RST is activated, the operations of the comparison unit 300 and the counting unit 400 are repeatedly performed while the feedback unit 200 is continuously enabled. Therefore, even if a transition time of the feedback signal P_FD is increased due to the PVT variations as above-mentioned, since the feedback unit 200 is continuously turned on, a completed level of the feedback signal P_FD can be supplied after a particular transition time.

Accordingly, even if the comparison unit 300 and the counting unit 400 receive the feedback signal P_FD which is not completely changed at an initial operation, the comparison unit 300 and the counting unit 400 are operated after a level of the feedback signal P_FD is stabilized. Thus, an initial malfunction can be prevented.

Figure 6:
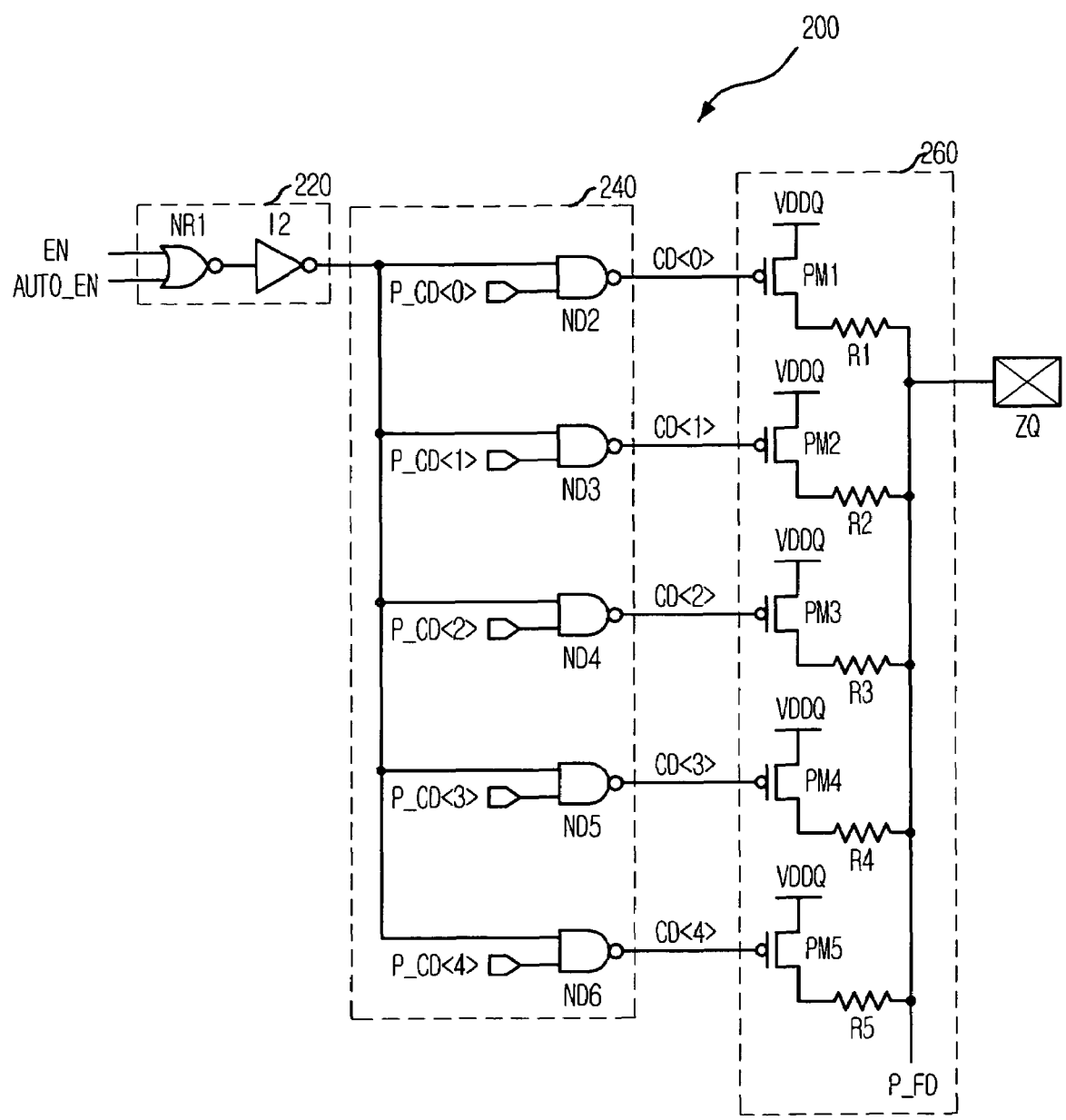
FIG. 6 is a schematic circuit diagram showing a feedback unit shown in FIG. 5.

FIG. 6 is a schematic circuit diagram showing the feedback unit 200 shown in FIG. 5.

As shown, the feedback unit 200 includes an input control unit 220, a signal input unit 240 and a feedback signal supply unit 260.

The input control unit 220 receives the first and second enable signals EN and AUTO_EN to generate an input-control signal. The signal input unit 240 receives the code signal group P_CD<0:4> in order to generate a selection signal group CD<0:4> in response to the input-control signal. The feedback signal supply unit 260 outputs a level of the selection signal group CD<0:4> corresponding to the input-resistor ZQ as the feedback signal P_FD.

The input control unit 220 includes a NOR gate NR1 for receiving the first and second enable signals EN and AUTO_EN; and an inverter I2 for inverting an output signal of the NOR gate NR1 in order to output the inverted signal as the input-control signal.

The signal input unit 240 includes a first NAND gate ND2 for receiving the input-control signal and a first code signal P_CD<0> to generate a first selection signal CD<0>; a second NAND gate ND3 for receiving the input-control signal and a second code signal P_CD<1> to generate a second selection signal CD<1>; a third NAND gate ND4 for receiving the input-control signal and a third code signal P_CD<2> to generate a third selection signal CD<2>; a fourth NAND gate ND5 for receiving the input-control signal and a fourth code signal P_CD<3> to generate a fourth selection signal CD<3>; and a fifth NAND gate ND6 for receiving the input-control signal and a fifth code signal P_CD<4> to generate a fifth selection signal CD<4>.

The feedback signal supply unit 260 includes first to fifth PMOS transistors PM1 to PM5 each gate of which receives a corresponding one of the selection signal group CD<0:4> and each source of which is connected to a voltage VDDQ; first to fifth resistors R1 to R5 each of which is connected between one drain of the first to the fifth PMOS transistors PM1 to PM5 and an output node; and the input-resistor ZQ connected to the output node in order to output a voltage loaded on the output node as the feedback signal P_FD.

An operation of the feedback unit 200 is described below.

The input control unit 220 activates the input-control signal as a logic high level when one of the first enable signal EN and the second enable signal AUTO_EN is activated.

Thereafter, the signal input unit 240 inverts the code signal group P_CD<0:4> to output the inverted signal as the selection signal group CD<0:4> in response to the activation of the input-control signal. When the input-control signal is inactivated as a logic low level, the signal input unit 240 inactivates all the selection signal group CD<0:4> as a logic high level regardless of a level of the code signal group P_CD<0:4>.

Thereafter, one of the PMOS transistors is turned on in response to an activation of a corresponding signal among the selection signal group CD<0:4> and, thus, a resistor coupled to one terminal of the active PMOS transistor is connected in parallel to the output node so that the feedback signal supply unit 260 outputs the feedback signal P_FD. That is, according to a resistance ratio between a pull-up resistor and the input-resistor ZQ, a voltage level of the feedback signal P_FD is determined. Herein, the pull-up resistor is formed because the resistor coupled to a drain of the active PMOS transistor is connected in parallel to the output node.

Referring to FIGS. 5 and 6, an operation of the on-die termination circuit is described below.

To begin with, when a semiconductor memory device is initially operated, as a level of an external power supply voltage is stabilized, a power-up signal PWRUP is activated with a pulse format. At this time, the initialization signal RST is also activated.

Thereafter, the pulse signal generation unit 120 generates the pulse signal CALP at regular intervals in response to the initialization signal RST. Then, the completion timing indication unit 140 continuously activates the auto-period signal CAL9 in response to a first activation of the pulse signal CALP.

Thereafter, the first enable signal generation unit 160 activates the first enable signal EN and the comparison enable signal LTCH_EN at each activation timing of the pulse signal CALP. Further, the second enable signal generation unit 180 activates the second enable signal AUTO_EN in response to activations of the auto-period signal CAL9 and the initialization signal RST. Herein, while the first enable signal EN is activated once, the comparison enable signal LTCH_EN is activated twice.

Thereafter, the feedback unit 200 outputs a level of the code signal group P_CD<0:4> corresponding to the input-resistor ZQ as the feedback signal P_FD in response to the first or second enable signals EN or AUTO_EN. As above-mentioned, since the second enable signal AUTO_EN is continuously activated from an activation time of the initialization signal RST to an inactivation time of the auto-period signal CAL9, the feedback unit 200 is continuously enabled by the second enable signal AUTO_EN.

Thereafter, the comparison unit 300 detects a level difference between the feedback signal P_FD and the reference voltage VREF in order to output the detection result in response to the first enable signal EN and the comparison enable signal LTCH_EN. Thereafter, the counting unit 400 performs a down-counting operation or an up-counting operation to a current version of the code signal group P_CD<0:4> according to a logic level of an output signal of the comparison unit 300 in order to generate a new version of the code signal group P_CD<0:4>.

Thereafter, when the pulse signal CALP is activated ten times or more, the completion timing indication unit 140 inactivates the auto-period signal CAL9 and activates the completion signal CAL_STP. Then, the first enable signal generation unit 160 no longer generates the first enable signal EN and the comparison enable signal LTCH_EN in response to the completion signal CAL_STP. Further, the second enable signal generation unit 180 inactivates the second enable signal AUTO_EN in response to the inactivation of the auto-period signal CAL9.

Meanwhile, the feedback unit 200 is continuously enabled. According to the conventional on-die termination circuit, the feedback unit is repeatedly turned on and off when the comparison unit and the counting unit are repeatedly operated and, thus, a wrong level of the feedback signal is transferred to the comparison unit and the counting unit causing a malfunction. However, since the feedback unit 200 is continuously enabled, the above-mentioned problem can be prevented. To mention again, by adjusting the feedback signal P_FD, a voltage level of the feedback signal P_FD corresponds to the reference voltage VREF and, thus, a resistance of a termination resistor supplied by the code signal group P_CD<0:4> is the same as that of the input-resistor ZQ.

Herein, the reference voltage VREF has a voltage level of (½)*VDDQ. Therefore, the code signal group P_CD<0:4> is adjusted for the feedback signal P_FD to have the voltage level (½)*VDDQ.

As explained above, the on-die termination circuit generates a plural bits of code signal so that a termination resistor which corresponds to the input-resistor can be set. Herein, the operation of feeding-back a voltage level of the code signal corresponding to the input-resistor is continuously performed. Therefore, the malfunction caused by the feedback signal which is not completely stabilized can be prevented.

As above-mentioned, in accordance with the first embodiment of the present invention, the feedback unit is continuously enabled while the on-die termination circuit is operated for preventing the malfunction.

Meanwhile, in accordance with a second embodiment of the present invention, an operation period of the feedback unit is shorter than that of the on-die termination circuit so that the termination resistor can be measured under the same condition where the on-die termination circuit is operated at an auto-refresh mode.

FIG. 7 is a wave diagram showing an operation of an on-die termination circuit in accordance with the second embodiment of the present invention.

Herein, the completion timing indication unit 140 according to the second embodiment activates the auto-period signal CAL9 in response to an activation of the pulse signal CALP, and inactivates the auto-period signal CAL9 when the pulse signal CALP is activated M times or more, and activates the completion signal CAL_STP when the pulse signal CALP is activated N times or more. Herein, the M and N are natural numbers and M is smaller than N. In one example, it is assumed that M is 9 and N is 15.

Referring to FIG. 7, the completion timing indication unit 140 according to the second embodiment inactivates the auto-period signal CAL9 when the pulse signal CALP is activated 9 times or more after the initialization signal RST is input. At this time, unlike the first embodiment of the present invention, the completion signal CAL_STP is not activated.

Thereafter, the second enable signal generation unit 180 inactivates the second enable signal AUTO_EN in response to an inactivation of the auto-period signal AUTO_EN, and the first enable signal generation unit 160 repeatedly activates the first enable signal EN and the comparison enable signal LTCH_EN at each activation time of the pulse signal CALP. Herein, the comparison enable signal LTCH_EN is activated twice while the first enable signal EN is activated once.

Thereafter, since the feedback unit 200 is controlled by the first enable signal EN activated with a pulse form, the feedback unit 200 is repeatedly turned on and off. Further, while the feedback unit 200 is turned on by the first enable signal EN, the comparison unit 300 and the counting unit 400 controlled by the comparison enable signal LTCH_EN are enabled twice in order to generate the code signal group P_CD<0:4> whose level corresponds to the feedback signal P_FD.

Thereafter, when the pulse signal CALP is detected 15 times or more, the completion timing indication unit 140 activates the completion signal CAL_STP. Then, in response to the completion signal CAL_STP, the first enable signal generation unit 160 inactivates the first enable signal EN and the comparison enable signal LTCH_EN.

Thereafter, the feedback unit 200, the comparison unit 300 and the counting unit 400 are turned off.

That is, the on-die termination circuit in accordance with the second embodiment of the present invention has a first period of operation and a second period of operation. At the first period, the comparison unit 300 and the counting unit 400 are repeatedly operated under the condition that the feedback unit 200 is continuously enabled by the second enable signal AUTO_EN which is activated from an activation time of the initialization signal RST to an inactivation time of the auto-period signal CAL9. At the second period, the feedback unit 200 is repeatedly turned on and off by the first enable signal EN after an inactivation time of the second enable signal AUTO_EN before an activation time of the completion signal CAL_STP.

That is, through the first period where the comparison unit 300 and the counting unit 400 are operated under the condition that the feedback unit 200 is continuously enabled, the above-mentioned problem due to the unstable level of the feedback signal P_FD can be prevented. Further, through the second period where the comparison unit 300 and the counting unit 400 are operated under the condition that the feedback unit 200 is repeatedly turned on and off, the operation of the on-die termination circuit is performed under the same condition of resetting the termination resistor according to an input of the auto-refresh command after the initial set of the termination resistor. Thus, an error from a normal operation can be minimized.

Although specific numbers are used here for explaining the embodiment of the invention, the present invention is not limited by those numbers.

While the present invention has been described with respect to the specific embodiments, it will be apparent to those skilled in the art that various changes and modifications may be made without departing from the spirit and scope of the invention as defined in the following claims.

What is claimed is:

1. An on-die termination circuit, comprising:
a feedback unit for outputting a feedback signal in response to a plurality of code signals corresponding to an input-resistor in response to a plurality of enable signals;
a code signal generation unit for generating the plurality of code signals in order for the feedback signal to have a level corresponding to a reference voltage; and
a control unit for continuously enabling the feedback unit in response to an initialization signal in order to repeatedly operate the code signal generation unit while the feedback unit is continuously enabled,
wherein the control unit includes a plurality of enable signal generation units for generating the plurality of enable signals.

2. The on-die termination circuit as recited in claim 1, wherein the control unit further includes:
a pulse signal generation unit for generating a pulse signal at particular intervals in response to the initialization signal; and
a completion timing indication unit for activating an auto-period signal in response to an activation of the pulse signal, and for inactivating the auto-period signal and activating a completion signal when the pulse signal is activated N times or more,
wherein the plurality of enable signal generation units includes:
a first enable signal generation unit for activating a first enable signal and a comparison enable signal at each activation time of the pulse signal, and for not generating the first enable signal and the comparison enable signal in response to the completion signal; and a second enable signal generation unit for generating a second enable signal in response to an activation of the auto-period signal and an activation of the initialization signal, wherein the first or second enable signal controls an operation of the feedback unit, and the first enable signal and the comparison enable signal control an operation of the code signal generation unit.

3. An on-die termination circuit, comprising:
a feedback unit for outputting a feedback signal in response to a plurality of code signals corresponding to an input-resistor and first and second enable signals;
a code signal generation unit for generating the plurality of code signals in order for the feedback signal to have a level corresponding to a reference voltage in response to the first enable signal and a comparison enable signal; and
a control unit for keeping an activation state of the second enable signal during a first period, repeatedly activating the second enable signal during a second period, and repeatedly activating the first enable signal and the comparison enable signal during the first and second periods.

4. The on-die termination circuit as recited in claim 3, wherein the first period ranges from an activation time of the initialization signal to an inactivation time of the auto-period signal, and the second period ranges from an inactivation time of the auto-period signal to an activation timing of the completion signal.

5. The on-die termination circuit as recited in claim 4, wherein the control unit includes:
a pulse signal generation unit for generating a pulse signal at particular intervals in response to the initialization signal;
a completion timing indication unit for activating the auto-period signal in response to an activation of the pulse signal, inactivating the auto-period signal when the pulse signal is activated M times or more, and activating the completion signal when the pulse signal is activated N times or more;
a first enable signal generation unit for activating the first enable signal and the comparison enable signal at each activation time of the pulse signal, and for not generating the first enable signal and the comparison enable signal in response to the completion signal, and
a second enable signal generation unit for generating the second enable signal in response to an activation of the auto-period signal and an activation of the initialization signal,
wherein M and N are natural numbers and M is smaller than N.

6. The on-die termination circuit as recited in claim 5, wherein the second enable signal generation unit includes:
a NAND gate for receiving the auto-period signal and the initialization signal; and
an inverter for inverting an output of the NAND gate to output the inverted signal as the second enable signal.

7. The on-die termination circuit as recited in claim 5, wherein the comparison enable signal is activated twice while the first enable signal is activated.

8. The on-die termination circuit as recited in claim 5, wherein the feedback unit includes:
an input control unit for receiving the first and second enable signals to generate an input-control signal;
a signal input unit for outputting the plural bits of code signal as a plural bits of selection signal in response to the input-control signal; and
a feedback signal supply unit for outputting a voltage level of the plural bits of selection signal corresponding to the input-resistor, as the feedback signal.

9. The on-die termination circuit as recited in claim 8, wherein the input control unit includes:
a NOR gate for receiving the first and second enable signals; and
an inverter for inverting an output of the NOR gate to output the inverted signal as the input-control signal.

10. The on-die termination circuit as recited in claim 8, wherein the signal input unit includes a plurality of NAND gates, each for receiving the input-control signal and a corresponding bit of a code signal to generate a corresponding bit of a selection signal.

11. The on-die termination circuit as recited in claim 8, wherein the feedback signal supply unit includes:
a plurality of PMOS transistors each gate of which receives one bit of a code signal and each source of which is connected to a first voltage;
a plurality of resistors each of which is connected between one drain of the plurality of PMOS transistors and an output node; and
the input-resistor coupled to the output node for outputting a voltage loaded on the output node as the feedback signal.

12. The on-die termination circuit as recited in claim 8, wherein the code signal generation unit includes:
a comparison unit for detecting a level difference between the feedback signal and the reference voltage in response to the first enable signal and the comparison enable signal; and
a counting unit for up-counting or down-counting the plural bits of code signal according to an output signal of the comparison unit.

13. A method for operating an on-die termination circuit, comprising:
outputting a feedback signal in response to a plurality of code signals corresponding to an input-resistor; and
adjusting the plurality of code signals for the feedback signal to have a target level corresponding to a reference voltage,
wherein the adjusting the plurality of code signals is repeatedly performed while the outputting the feedback signal is continuously performed during a first period, and an operation of performing the adjusting the plurality of code signals twice, after performing the outputting the feedback signal once, is repeatedly performed during a second period after the first period.

* * * * *